(12) United States Patent
Creguer et al.

(10) Patent No.: US 9,102,299 B2
(45) Date of Patent: Aug. 11, 2015

(54) SYSTEM AND METHOD FOR DETERMINING DRIVER IDENTIFICATION BY A REMOTE DEVICE

(75) Inventors: Aaron P. Creguer, Otter Lake, MI (US); David T. Proefke, Troy, MI (US); Roy Y. Asmar, Southfield, MI (US); Thomas E. Utter, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 267 days.

(21) Appl. No.: 13/494,475

(22) Filed: Jun. 12, 2012

(65) Prior Publication Data
US 2013/0166104 A1    Jun. 27, 2013

Related U.S. Application Data

(60) Provisional application No. 61/578,528, filed on Dec. 21, 2011.

(51) Int. Cl.
*G08C 19/00* (2006.01)
*B60R 25/24* (2013.01)

(52) U.S. Cl.
CPC .............. *B60R 25/245* (2013.01); *G08C 19/00* (2013.01)

(58) Field of Classification Search
CPC .............................. G08C 19/00; B60R 25/245
See application file for complete search history.

(56) References Cited

U.S. PATENT DOCUMENTS

| | | | | |
|---|---|---|---|---|
| 5,973,611 | A * | 10/1999 | Kulha et al. | 340/5.62 |
| 2009/0284359 | A1* | 11/2009 | Huang et al. | 340/426.1 |
| 2010/0308986 | A1* | 12/2010 | Dobryden et al. | 340/438 |
| 2011/0137773 | A1* | 6/2011 | Davis et al. | 705/34 |

* cited by examiner

*Primary Examiner* — John Q Nguyen
*Assistant Examiner* — Michael Kerrigan
(74) *Attorney, Agent, or Firm* — Cantor Colburn LLP

(57) ABSTRACT

A driver identification system for a vehicle is provided. The vehicle has a driver's side front door. The driver identification system includes at least one remote device, and a control module. The remote device is activated to send an authentication signal. The control module is in selective communication with the at least one remote device. The control module receives a signal indicating that the driver's side front door of the vehicle is opened. The control module includes control logic for sending an inquiry signal if the signal indicating the driver's side front door is opened is received by the control module. The inquiry signal is configured for activating the at least one remote device to send the authentication signal.

17 Claims, 3 Drawing Sheets

SYSTEM AND METHOD FOR DETERMINING DRIVER IDENTIFICATION BY A REMOTE DEVICE

CROSS-REFERENCE TO RELATED APPLICATIONS

This patent application claims priority to U.S. Provisional Patent Application Ser. No. 61/578,528, filed Dec. 21, 2011, which is incorporated herein by reference in its entirety.

FIELD OF THE INVENTION

Exemplary embodiments of the invention relate to a driver identification system for a vehicle and, more particularly, to a driver identification system for a vehicle including at least one remote device selectively activated to send an authentication signal.

BACKGROUND

Passive entry and starting systems perform the functions of unlocking the doors and starting a vehicle, without the need for a key. Specifically, a fob or other type of remote device unlocks the doors and starts a vehicle without a key.

Several fobs may be associated with a single vehicle. Each fob is associated with a specific individual. Thus, each fob may also provide a driver identifier to a control module of the vehicle, where the driver identifier indicates the specific individual who is the driver of the vehicle. Certain vehicle settings may be based on the driver identifier. For example, the driver identifier may indicate a specific individual's seat position. The driver identifier is dependent on the fob that is detected when the driver's side front door is unlocked. Specifically, a control module in the vehicle may send an inquiry signal (also referred to as a "challenge") to the fob in the event the driver's side front door is unlocked. If the fob receives the inquiry signal, the fob sends a corresponding signal back to the control module indicating the specific individual that the fob is associated with (the corresponding signal is also referred to as a "response"). The control module includes logic for decrypting the corresponding signal from the fob to determine the driver identifier. However, sometimes a driver may enter and start the vehicle with either the incorrect driver identifier, or with no driver identifier established. As a result, specific vehicle settings such as the driver's seat position are not adjusted accordingly.

One instance of the driver identifier not being established may occur if the driver first enters the vehicle through one of the passenger doors, and then places the fob in one of the passenger seats. In this example, the driver does not carry the fob on his or her person, but rather keeps the fob in an article of clothing (e.g., a jacket) or a carrying device (e.g., a backpack or a suitcase). The driver then opens the driver's side front door, is seated in the driver's seat, and starts the vehicle. However, because the driver did not carry the fob on his or her person and unlock the driver's side front door, the fob is unable to provide the driver identifier. Thus, vehicle settings such as the seat position will not be updated.

In another approach, a driver may enter an unlocked vehicle through the driver's side front door, and a passenger may also enter the vehicle through the passenger's door. The passenger carries the fob on his or her person. In this scenario, the fob is also unable to provide the correct driver identifier, and vehicle settings such as the seat position will not be adjusted. In yet another example, if a driver enters the vehicle through an unlocked driver's side front door, the fob is also unable to provide the correct driver identifier. Accordingly, it is desirable to provide a driver identification system for a vehicle that provides a driver identifier even if a driver does not unlock a driver's side front door while carrying the fob on his or her person.

SUMMARY OF THE INVENTION

In one exemplary embodiment of the invention, a driver identification system for a vehicle is provided. The vehicle has a driver's side front door. The driver identification system includes at least one remote device, and a control module. The remote device is activated to send an authentication signal. The control module is in selective communication with the at least one remote device. The control module receives a signal indicating that the driver's side front door of the vehicle is opened. The control module includes control logic for sending an inquiry signal if the signal indicating the driver's side front door is opened is received by the control module. The inquiry signal is configured for activating the at least one remote device to send the authentication signal.

In another exemplary embodiment of the invention, a vehicle having a driver identification system is provided. The driver identification system includes at least one remote device that is selectively activated to send an authentication signal. The vehicle includes a vehicle start module and a control module. The vehicle start module sends a signal indicating that the vehicle has been requested to start passively to a key-on state. The control module is in selective communication with the at least one remote device and in communication with the vehicle start module. The control module receives the signal from the vehicle start module. The control module includes control logic for sending an inquiry signal if the signal is received by the control module, the inquiry signal configured for activating the at least one remote device to send the authentication signal.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
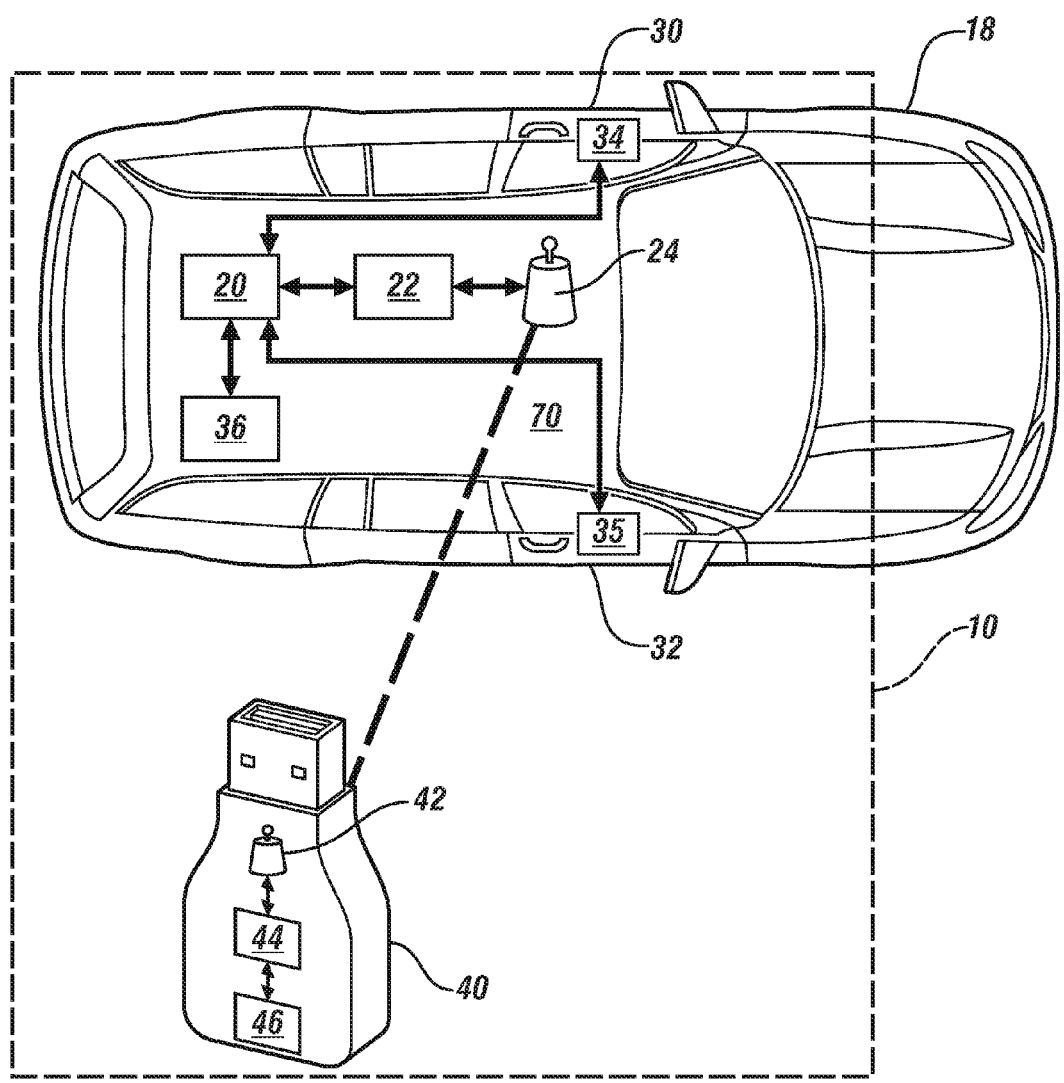
FIG. 1 is an exemplary schematic illustration of a vehicle having a driver identification system.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to a driver identification system 10 employed in a vehicle 18. The driver identification system 10 includes a control module 20, a transceiver 22, an antenna 24, a driver's side front door 30, a passenger's side front door 32, a driver's side front door latching system 34, a passenger's side front door latching system 35, a vehicle start module 36 and at least one remote device 40. In the embodiment as shown in FIG. 1, the at least one remote device 40 is a key fob. However, the remote device 40 may be any portable device that a user may carry either on his or her person or in a wallet or purse such as, for example, a card. In the embodiment as shown, the driver identification system 10 is a passive entry and starting system where the remote device 40 performs the functions of unlocking the doors 30, 32 and starting the vehicle 18, without the need for a key.

The control module 20 is in selective wireless communication with the remote device 40 through the transceiver 22 and the antenna 24. The remote device 40 may include an antenna 42, a transceiver 44, and a control module 46. The remote device 40 is associated with a specific individual. In one embodiment, multiple remote devices 40 may be associated with the driver identification system 10, where each remote device 40 is associated with a specific individual. The control module 46 of the remote device 40 may include a memory that stores information indicating the specific individual that is associated with the remote device 40.

The control module 20 of the vehicle 18 also includes a memory that stores specific settings associated with at least one driver profile. The driver profiles stored in the control module 20 are each associated with a specific individual, and include vehicle settings that are customized for the specific individual such as, for example, seat position. The control module 20 may be in communication with one or more control modules (not shown) that may update specific vehicle settings based on a current driver profile of the vehicle 18. For example, in one embodiment, the control module 20 may be in communication with a driver's seat control module, where a position of a driver's seat (not shown) may be adjusted based on the current driver of the vehicle 18.

The control module 20 is configured for selectively sending an inquiry signal to the remote device 40 in the event the doors 30, 32 of the vehicle 18 have been opened, or unlocked. In one exemplary embodiment, the inquiry signal is a low frequency signal ranging from about 125 to about 135 kHz. If the remote device 40 is located within a specific range of the antenna 24 of the vehicle 18, the antenna 42 of the remote device 40 receives the inquiry signal. The remote device 40 is selectively activated to send an authentication signal back to the antenna 24. Specifically, upon receipt of the inquiry signal, the control module 46 of the remote device 40 sends an authentication signal that is received by the antenna 24 of the vehicle 18. In one exemplary embodiment, the authentication signal is an ultra-high frequency signal ranging from about 315 MHz to about 433.9 MHz. In the event the control module 20 receives the authentication signal from the remote device 40, the control module 20 includes control logic for updating the current driver profile of the vehicle 18 with the specific individual associated with the remote device 40, which is discussed below and described in FIGS. 3-5.

The control module 20 monitors the driver's side front door latching system 34 and the passenger's side latching system 35 to determine if the driver's side front door 30 or the passenger's side front door 32 are opened or unlocked. Alternatively, in another exemplary embodiment, a door control module (not illustrated) may be in communication with the control module 20 to send a signal indicating that the driver's side front door 30 or the passenger's side front door 32 are opened or unlocked.

The control module is also in communication with the vehicle start module 36. The vehicle start module 36 sends a signal to the control module 20 indicating whether the vehicle 18 is in a key-on or a key-off state. Specifically, the vehicle start module 36 indicates whether the vehicle 18 has been requested to passively start to the key-on state. A passive or keyless start of the vehicle 18 may occur in the event a driver presses a starter button or twists an ignition switch or other start request control (not illustrated), with the remote device 40 located within an interior cabin 70 of the vehicle 18. It should be noted that while the terms key-on and key-off are used, a key is generally not employed. Instead, the key-on state exists when power is supplied to a propulsion system (not shown) of the vehicle 18. The key-off state exists when power is not supplied to the propulsion system.

Figure 2A:
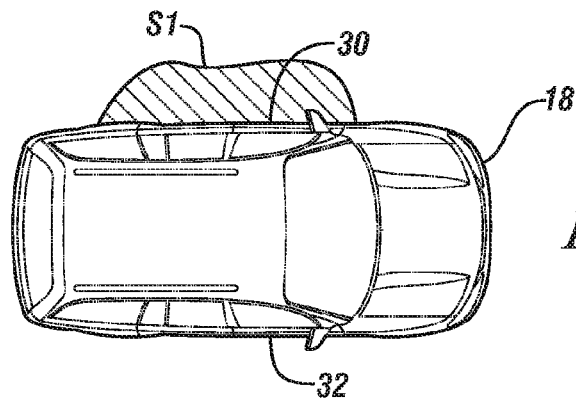
FIGS. 2A-2D are illustrations of a control module shown in FIG. 1 sending an inquiry signal.
Figure 2B:
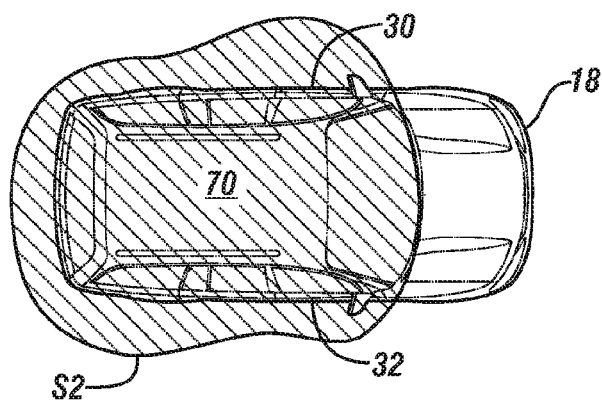
Figure 2C:
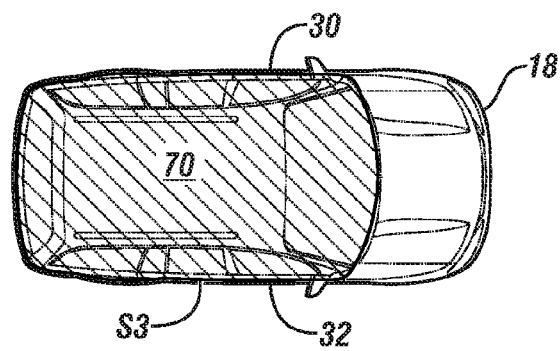
Figure 2D:
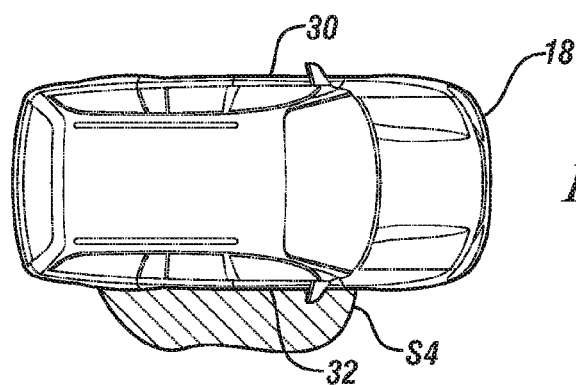

FIGS. 2A-2D illustrate the vehicle 18 with different configurations of the control module 20 (shown in FIG. 1) sending the inquiry signal. Specifically, shaded areas S1-S4 (shown in FIGS. 2A-2D, respectively) illustrate the different ranges that may be covered by the inquiry signal. FIG. 2A illustrates a shaded region S1, where the inquiry signal covers a controlled region around the outside of or exterior to the driver's side front door 30. In one embodiment, the shaded region S1 extends about two meters outside of or exterior to the driver's side front door 30. FIG. 2B illustrates a shaded region S2, which covers substantially the entire interior cabin 70 of the vehicle 18, as well as an exterior region outside of the vehicle 18. In one embodiment, the shaded region S2 extends about two meters around the exterior region of the vehicle 18. FIG. 2C illustrates a shaded region S3 that covers substantially the entire interior cabin 70 of the vehicle 18. FIG. 2D illustrates a shaded region S4, which covers a controlled region around the outside of or exterior to the passenger's side front door 32. In one embodiment, the shaded region S4 extends about two meters from the passenger's side door 32. Although a measurement of two meters is discussed, it is to be understood that the measurements discussed are exemplary embodiments and that other measurements may be used as well.

Figure 3:
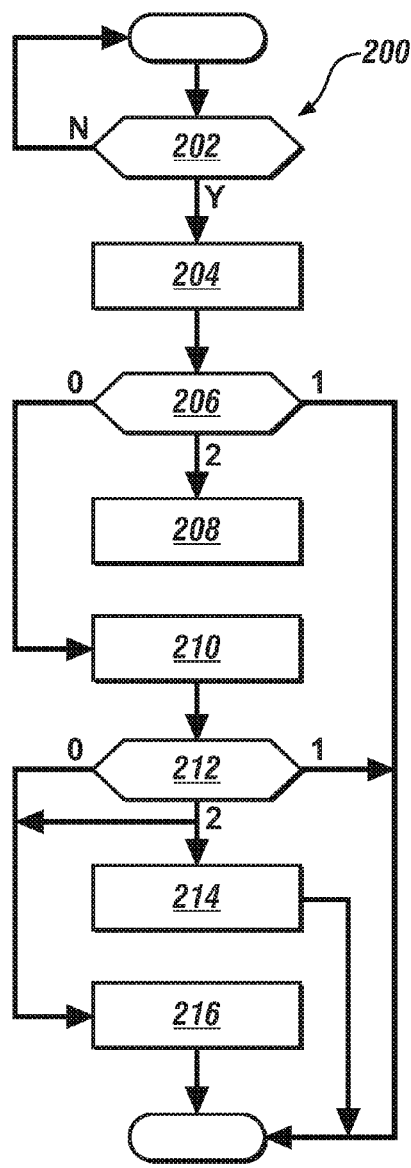
FIG. 3 is a process flow diagram of one example of operating the driver identification system in FIG. 1.

A method of operating the driver identification system 10 will now be explained. Referring to FIG. 3, an exemplary process flow diagram illustrating an exemplary process of operating the driver identification system 10 is generally indicated by reference number 200. With reference to FIGS. 1-3, process 200 begins at step 202, where the control module 20 monitors and determines if the driver's side front door 30 has been opened. Specifically, with reference to FIGS. 1 and 3, the control module 20 monitors the driver's side front door latching system 34 to determine if the driver's side front door 30 has been opened. Once the driver's side front door 30 is opened, process 200 may then proceed to step 204.

In step 204, the control module 20 sends the inquiry signal to the shaded region S1 (which is illustrated in FIG. 2A) in the event the driver's side front door 30 is opened. Process 200 may then proceed to step 206.

In step 206, the control module 20 monitors the antenna 24 through the transceiver 22 for the authentication signal. In one embodiment, only 1 authentication signal from a single remote device 40 is received by the control module 20. In this case, the control module 20 may update the current driver profile with the driver identifier associated with the remote device 40 that sent the authentication signal. Process 200 may then terminate.

In the event two or more remote devices 40 send authentication signals back to the control module 20 though the antenna 24, then process 200 may proceed to step 208, where the control module 20 utilizes the last current driver profile that is saved in the memory of the control module 20 as the current driver profile. Process 200 may then terminate.

In the event no authentication signal is received by the antenna 24 and sent to the control module 20, process 200 may then proceed to step 210. In step 210, the control module 20 sends the inquiry signal to the entire interior cabin 70 of the vehicle 18, as well as an exterior region outside of the vehicle 18 (which is illustrated as the shaded region S2 in FIG. 2B). Process 200 may then proceed to step 212.

In step 212, the control module 20 monitors the antenna 24 through the transceiver 22 for the authentication signal. In one embodiment, only 1 authentication signal from a single remote device 20 is received by the control module 20. In this case, the control module 20 may update the current driver profile with the specific individual associated with the remote device 40 that sent the authentication signal. Process 200 may then terminate.

In the event no authentication signal is received by the antenna 24 and sent to the control module 20, process 200 may return to step 210 at least once, where the inquiry signal may be resent. That is, in the event that no authentication signal is received, process 200 may return to step 210 at least once to create a retry sequence for robustness. In the event that no authentication signal is received even after process 200 has repeated steps 210 and 212 at least once, process 200 may proceed to step 216, where the control module 20 utilizes the last current driver profile that is saved in the memory of the control module 20. Process 200 may then terminate.

Figure 4:
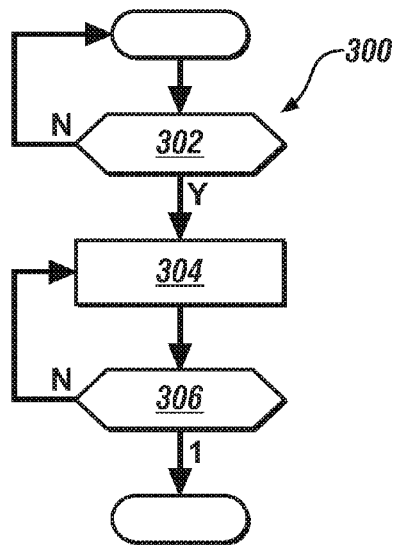
FIG. 4 is a process flow diagram of another example of operating the driver identification system in FIG. 1.

In the event two remote devices 40 send authentication signals back to the control module 20 though the antenna 24, then process 200 may proceed to step 214. In step 214, if the passenger's side front door 32 has been opened within a specified time frame of the driver's side door 30 being opened in step 202 (e.g. in one embodiment the specified time is about thirty seconds), the control module 20 includes control logic for determining if a passenger identifier has been established. FIG. 4 is an illustration of a process flow diagram illustrating an exemplary approach for determining the passenger identifier, and is discussed in detail below. In the event a passenger identifier has been established, process 200 may then proceed to step 214. In the event no passenger identifier has been established, process 200 may then proceed to step 216, where the control module 20 utilizes the last current driver profile that is saved in the memory of the control module 20. Process 200 may then terminate.

In step 214, the control module 20 determines the current driver profile by selecting the remote device 40 that is not established as the passenger identifier as the current driver profile. Process 200 may then terminate.

FIG. 4 is an exemplary process flow diagram illustrating an exemplary process of establishing the passenger identifier generally indicated by reference number 300. With reference to FIGS. 1-2 and 4, process 300 begins at step 302, where the control module 20 monitors and determines if the passenger's side front door 32 has been opened. Specifically, with reference to FIGS. 1 and 4, the control module 20 monitors the passenger's side front door latching system 35 to determine if the passenger's side front door 32 has been opened. Once the passenger's side front door 32 is opened, process 300 may then proceed to step 304.

In step 304, the control module 20 sends the inquiry signal to the shaded region S4 (which is illustrated in FIG. 2D) in the event the passenger's side front door 32 is opened. Process 300 may then proceed to step 306.

In step 306, the control module 20 monitors the antenna 24 through the transceiver 22 for the authentication signal. In the event a single authentication signal from the remote device 40 is received by the control module 20, the control module 20 may establish the passenger identifier with the driver identifier associated with the remote device 40 that sent the authentication signal. Process 300 may then terminate. In the event no authentication signal is received from the remote device 40, process 200 may return to step 304 and repeat process 200 at least once.

Figure 5:
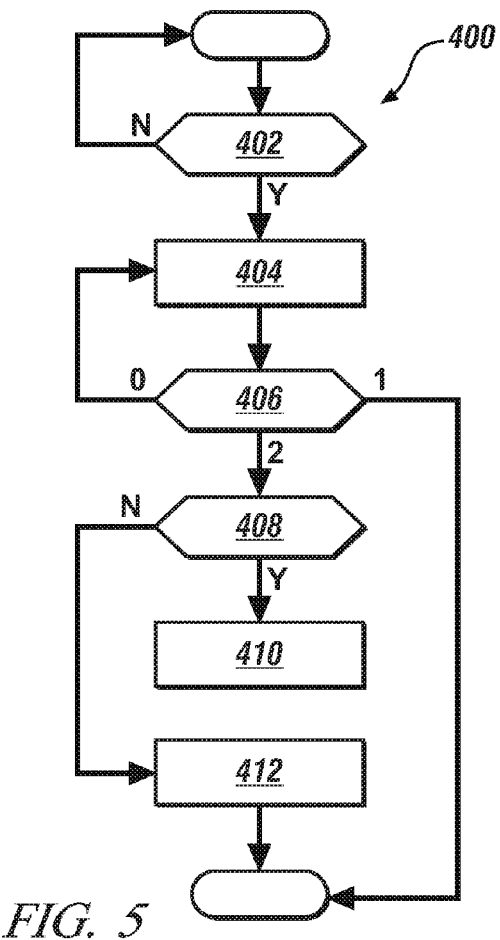
FIG. 5 is a process flow diagram of yet another example of operating the driver identification system in FIG. 1.

FIG. 5 is an exemplary process flow diagram illustrating an exemplary process of operating the driver identification system 10, where a request has been made to passively start the vehicle 18 (e.g., a driver presses a starter button or twists an ignition switch). Specifically, with reference to FIGS. 1 and 5, process 400 begins at step 402, where the control module 20 monitors and determines if the vehicle 18 has been requested to start passively. Referring to FIG. 1, the control module 20 is in communication with the vehicle start module 36. The vehicle start module 36 sends a signal to the control module 20 indicating whether the vehicle 18 has been requested to start passively to the key-on state. Once the vehicle 18 has been requested to start passively to the key-on state, process 400 may then proceed to step 404.

In step 404, the control module 20 sends the inquiry signal to the shaded region S3 (which is illustrated in FIG. 2C) in the event the vehicle 18 has been requested to start passively to the key-on state. Process 400 may then proceed to step 406.

In step 406, the control module 20 monitors the antenna 24 through the transceiver 22 for the authentication signal. In one embodiment, only one authentication signal from a single remote device 20 is received by the control module 20. In this case, the control module 20 may update the current driver profile with the driver identifier associated with the remote device 40 that sent the authentication signal. Process 400 may then terminate.

In the event no authentication signal is received by the antenna 24 and sent to the control module 20, process 400 may then return to step 404. Process 400 may repeat step 404 at least once, and if no authentication signal is still received by the antenna 24, the control module 20 utilizes the last current driver profile that is saved in the memory of the control module 20. Process 400 may then terminate.

In the event two remote devices 40 send authentication signals back to the control module 20 though the antenna 24, then process 200 may proceed to step 408. In step 408, if the passenger's side front door 32 has been opened, the control module 20 includes control logic for determining if the passenger identifier has been established. As discussed above and illustrated in FIG. 4, in the event a passenger identifier has been established, process 400 may then proceed to step 410. In the event no passenger identifier has been established, process 400 may then proceed to step 412, where the last current driver profile that is saved in the memory of the control module 20. Process 400 may then terminate.

In step 410, the control module 20 determines the current driver profile by selecting the remote device 40 that is not established as the passenger identifier as the current driver profile. Process 400 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A driver identification system for a vehicle, the vehicle having a driver's side front door and a passenger's side front door, the driver identification system comprising:
   at least one remote device selectively activated to send an authentication signal;
   a control module that is in selective communication with the at least one remote device, the control module receiving a signal indicating that the driver's side front door of the vehicle is opened, the control module includes control logic for:
   sending an inquiry signal if the signal indicating the driver's side front door is opened is received by the control module, the inquiry signal configured for activating the at least one remote device to send the authentication signal;
   based on receiving a single authentication signal in response to the inquiry signal, updating a current driver profile with a driver identifier associated with the single authentication signal;
   sending a second inquiry signal in the event the authentication signal is not received by the control module, wherein the second inquiry signal is sent to an interior of the vehicle and a surrounding exterior region of the vehicle;
   based on receiving a response to the second inquiry signal, the response including the authentication signal, updating the current driver profile with a driver identifier associated with the authentication signal, and
   based on the control module receiving authentication signals from two remote devices in response to the second inquiry signal, the control module determines if a passenger identifier has been previously established and updates the current driver profile with a driver identifier associated with the authentication signal not associated with the passenger identifier.

2. The driver identification system as recited in claim 1, wherein the inquiry signal is sent to a driver's side region that is located exterior to the driver's side front door.

3. The driver identification system as recited in claim 1, wherein the control module includes control logic for utilizing a last driver profile saved in a memory of the control module if a second authorization signal is not received after the second inquiry signal is sent.

4. The driver identification system as recited in claim 1, wherein the control module includes control logic for determining a current driver profile by selecting one of the two remote devices that has not been established as the passenger identifier as the current driver profile.

5. The driver identification system as recited in claim 1, wherein if two or more remote devices send the authentication signal back to the control module, the control module includes control logic for utilizing a last current driver profile saved in a memory of the control module as a current driver profile.

6. The driver identification system as recited in claim 5, wherein the current driver profile includes customized vehicle settings.

7. The driver identification system as recited in claim 5, wherein the current driver profile includes a customized seat position for a driver's seat.

8. The driver identification system as recited in claim 1, wherein if a single authentication signal from a single remote device is received by the control module, the control module includes control logic for updating a current driver profile with an individual identifier associated with the single remote device that sent the single authentication signal.

9. The driver identification system as recited in claim 1, wherein if a passenger's side front door is opened within a specified time frame of the driver's side door being opened, the control module includes control logic for sending a passenger inquiry signal to a passenger's side region located exterior to the passenger's side front door.

10. The driver identification system as recited in claim 9, wherein if a single passenger authentication signal is received by the control module after the passenger inquiry signal is sent, the control module includes control logic for establishing the passenger identifier to be the same as an individual identifier associated with a remote device that sent the single passenger authentication signal.

11. A vehicle having a driver identification system comprising:
    at least one remote device selectively activated to send an authentication signal;
    a vehicle start module that sends a signal indicating that the vehicle has been requested to start passively to a key-on state; and
    a control module that is in selective communication with the at least one remote device and in communication with the vehicle start module, the control module receiving the signal from the vehicle start module, the control module including control logic for:
    sending an inquiry signal if the signal is received by the control module, the inquiry signal configured for activating the at least one remote device to send the authentication signal;
    based on receiving a single authentication signal in response to the inquiry signal, updating a current driver profile with a driver identifier associated with the single authentication signal;
    sending a second inquiry signal in the event the authentication signal is not received by the control module, wherein the second inquiry signal is sent to an interior of the vehicle and a surrounding exterior region of the vehicle; and
    based on receiving a response to the second inquiry signal, the response including the authentication signal, updating the current driver profile with a driver identifier associated with the authentication signal;
    wherein based on the control module receiving authentication signals from two remote devices in response to the second inquiry signal, the control module determines if a passenger identifier has been previously established and updates the current driver profile with a driver identifier associated with the authentication signal not associated with the passenger identifier.

12. The vehicle as recited in claim 11, wherein the inquiry signal is sent to substantially an entire interior cabin of the vehicle.

13. The vehicle as recited in claim 11, wherein the control module includes control logic for re-sending the inquiry signal at least once if the control module does not receive the authentication signal from the at least one remote device.

14. The vehicle as recited in claim 11, wherein the control module includes control logic for determining a current driver profile by selecting one of the two remote devices that has not been established as the passenger identifier as the current driver profile.

15. The vehicle as recited in claim 11, wherein if a single authentication signal from a single remote device is received by the control module, the control module includes control logic for updating a current driver profile with an individual identifier associated with the single remote device that sent the single authentication signal.

16. The vehicle as recited in claim 11, wherein if a passenger's side front door is opened within a specified time frame of a driver's side door being opened, the control module includes control logic for sending a passenger inquiry signal to a passenger's side region located exterior to the passenger's side front door.

17. The vehicle as recited in claim 16, wherein if a single passenger authentication signal is received by the control module after the passenger inquiry signal is sent, the control module includes control logic for establishing the passenger identifier to be the same as an individual identifier associated with a remote device that sent the single passenger authentication signal.

* * * * *